United States Patent Office 2,768,958
Patented Oct. 30, 1956

2,768,958
COLLOIDAL DISPERSIONS OF HEAVY METAL COMPOUNDS

William D. Stewart, Arlington, Va., and Joseph B. Hoertz, Cuyahoga Falls, Ohio, assignors to The B. F. Goodrich Company, New York, N. Y., a corporation of New York No Drawing. Application April 8, 1954, Serial No. 421,958

13 Claims. (Cl. 252—313)

This invention relates to colloidal dispersions of heavy metal compounds and more specifically pertains to novel aqueous colloidal dispersions of water-insoluble heavy metal salts and hydroxides and the method of their preparation.

Many of the heavy metals of groups IB and IIB of the periodic table such as silver, copper, cadmium, zinc, mercury and gold, and their salts and hydroxides, are known to be quite toxic to microorganisms at high dilutions. The most economical utilization of the toxicity of these heavy metals is through the use of dilute aqueous solutions of their water-soluble salts. But for industrial and agricultural purposes the use of water-soluble salts presents the problem of removal of the salts by leaching from the material to be protected. Also, many of the water-soluble salts of these heavy metals, because of their color, stain the material to be protected to a greater degree than can be tolerated. In addition, some of the water-soluble salts will hydrolize or oxidize and yield corrosive or otherwise harmful products which destroy the material to which they are applied as a protective agent.

The next most economical method of utilizing the toxicity of the heavy metal salts against microorganisms is to employ an aqueous dispersion of water-insoluble compounds. This overcomes the problem of removal by leaching, but presents a new problem, that of preparing a stable dispersion of extremely small particle size. The particle size of the freshly precipitated salts and hydroxide prepared by methods heretofore known is in general too large for economical application of these heavy metal ion containing precipitates against microorganisms because the particles or agglomerates deposited upon the material to be protected are far too large. These large particles contain a sufficient amount of toxic protectant to protect a much larger area if they were reduced to discrete, minute particles.

We have discovered a method of preparing an aqueous colloidal dispersion of discrete, minute particles of water-insoluble salts and hydroxides of heavy metals which are sufficiently stable to permit their application as a protective agent against microorganisms. These aqueous colloidal dispersions are prepared by the formation of a water-insoluble salt or hydroxide of the heavy metal in situ in an aqueous solution of an N-alkyl beta-amino propionic acid as a dispersing agent. The water-insoluble compounds are formed as discrete, minute particles and are maintained in colloidal suspension by the N-alkyl-beta-amino propionic acid. Aqueous colloidal dispersions of water-insoluble heavy metal salts prepared according to this invention are stable for relatively long periods of time and, even when containing as much as 1% by weight of the suspended and dispersed water-insoluble heavy metal salt or hydroxide are fairly clear immediately after preparation.

The clarity of the freshly prepared mixture of heavy metal salt and precipitating anion in the presence of the N-alkyl beta-alanine is of such high degree that it resembles a true solution. On standing the mixture gradually becomes cloudy, but the compound remains in suspension as fine particles for a period of time up to about 40 hours. The length of time that the compound is held in apparent solution and then in colloidal suspension can be controlled to some degree by regulating the relative concentrations of dispersing agent and the amount of ions that react to form an insoluble compound. By following the general preparation described above, aqueous colloidal dispersions containing from 0.001% (10 p. p. m.) to 1% by weight and above of a water-insoluble heavy metal salt can be prepared by employing from about 0.05% to 5% by weight of the N-alkyl beta-amino propionic acid as the dispersing agent.

N-alkyl beta-amino propionic acids, also known as N-alkyl-beta-alanines, which are useful as dispersing agents according to this invention are those which contain 8 to 14 carbon atoms in the alkyl group. Members of this class of dispersing agents include among others such specific compounds as N-octyl beta-amino-propionic acid, N-nonyl beta-amino propionic acid, N-decyl beta-amino propionic acid, N-undecyl beta-amino propionic acid, N-dodecyl beta-amino propionic acid, N-tridecyl beta-amino propionic acid, and N-tetradecyl beta-amino propionic acid as well as isomers of these compounds.

The following example illustrates the preparation of specific dispersions of heavy metal salts and hydroxides obtainable according to this invention.

EXAMPLE I

A 1.0% by weight solution of N-dodecyl beta-alanine (N-dodecyl beta-amino propionic acid) in dilute hydrochloric acid was prepared by dissolving 10 parts by weight of dodecyl beta-alanine in 990 parts by weight of 0.0012 N-hydrochloric acid. To 25 parts by weight of this solution there was added 2.5 parts by weight of an aqueous solution containing 1.0% by weight of silver nitrate thereby forming AgCl in situ in the presence of N-dodecyl beta-alanine. The resulting aqueous mixture was thoroughly agitated for about a minute to insure complete mixing of the two aqueous solutions. A light transmission study of this dispersion was made. For purposes of comparison in light transmission, 25 parts by weight of 0.0012 N-hydrochloric acid and 2.5 parts by weight of a 1% aqueous silver nitrate solution were thoroughly mixed. Portions of these two aqueous silver chloride compositions were tested with a Fisher electro-photometer employing a B-425 filter to determine the amount of light transmitted through them. The results of these tests are tabulated below. Each composition contained 0.032% AgCl but the first composition described contained 0.963% dodecyl beta-alanine as the dispersing agent while the other compositions contained no dispersing agent.

The light transmission test was employed as a means for measuring the clarity of the dispersions. The aqueous mixture containing only 0.032% silver chloride was quite cloudy immediately upon mixing the silver nitrate and hydrochloric acid solutions as would be expected and a minute after standing was quite milky as indicated in Table I by transmitting only 29% of the light. The transmission of light by this mixture decreased quite rapidly and after only 7 minutes the transmission of light dropped to only 12%. This demonstrates that the size of the silver particles increases quite rapidly when no dispersing agent is present. The dispersion of silver chloride prepared with N-dodecyl beta-alanine transmitted 63% of the source light 30 minutes after preparation and in an additional 30 minutes still transmitted more light than the mixture containing no dispersing agent did only one minute after being prepared. Not only did the presence of the N-alkyl beta-alanine provide a very fine dispersion of silver chloride particles but it retarded considerably the growth of the particle size.

Table I

PERCENT LIGHT TRANSMITTED BY AQUEOUS AgCl COMPOSITIONS

| Minutes after preparation | With dodecyl beta-alanine as dispersing agent | No dispersing agent |
|---|---|---|
| 1 | 100 | 29 |
| 2 | 100 | 22 |
| 5 | | 16 |
| 7 | 90 | 12 |
| 30 | 63 | 0 |
| 45 | 46 | 0 |
| 60 | 32 | 0 |
| 75 | 22 | 0 |
| 120 | 16 | 0 |

100%=Completely clear.
0%=Too cloudy to measure.

EXAMPLES II TO IV

The following examples further illustrate that aqueous dispersions of silver halides prepared according to this invention not only are extremely clear, but also are extremely stable, that is, the particle growth is retarded. These dispersions were prepared by adding to 25 parts by weight of 0.006 N-hydrochloric acid containing 1.0% by weight of N-dodecyl beta-alanine, various quantities of a 1.0% by weight silver nitrate solution. The resulting dispersions were tested at various periods of time after preparation for their clarity by the light transmission test hereinbefore employed. These examples are tabulated in Table II wherein the quantity of silver nitrate solution used, the quantity of silver chloride and N-dodecyl beta-alanine present expressed in percent and the percent transmission of light, are given:

Table II

| Example Number | Parts by weight AgNO₃ Solution | Percent of Composition | | Percent Transmission of Light, Minutes after Preparation | | | | |
|---|---|---|---|---|---|---|---|---|
| | | AgCl | dodecyl Beta-alanine | 1 | 5 | 15 | 30 | 60 |
| II | 0.5 | 0.017 | 0.980 | 99.8 | 91.0 | 90.0 | 87 | 83 |
| III | 1.0 | 0.032 | 0.963 | 93.0 | 92.0 | 90.0 | 87 | 83 |
| IV | 1.5 | 0.048 | 0.944 | | 65 | 62 | 59 | 54 |

All of the light transmission tests whose results are reported in Examples I to IV were conducted with the same constant source of light.

The data in Tables II and III further emphasizes that the fact that the use of N-alkyl beta-alanines in preparing dispersion of silver chloride results in an extremely clear dispersion of very minute particles of silver chloride whose size increases but very slowly over a period of one hour. Not all N-alkyl beta-alanines can be used to prepare such stable dispersions. N-dimethyl, N-ethyl and N-di-n-propyl beta-alanines when employed in place of N-dodecyl beta-alanine used in Examples II to IV gave very poor dispersions whose light transmissions one minute after standing were 30, 10 and 10 respectively. The presence of these three compounds during the formation of silver chloride was no better than in the check of Example I where no dispersing agent was employed. In fact, ethyl and di-n-propyl beta-alanines actually hastened the growth of the silver containing particles.

EXAMPLES VI TO IX

A series of aqueous dispersions of silver chloride were prepared, in situ, at room temperature in the presence of N-alkyl beta-alanines in which the alkyl group had from 8 to 14 carbon atoms.

For purposes of direct comparison between the various amines, a 1% water solution of the sodium salts of each beta-alanine tested was prepared. These solutions were then acidified with concentrated HCl until a perfectly clear solution resulted. In the case of N-dodecyl beta-alanine, an additional 1% water solution of the free amino acid was prepared and 30% KOH was added to clarify the solution. To 30 ml. of each of these test solutions were added 3 ml. of a 1% solution of silver nitrate. The results are tabulated below:

Table III

| Dispersing Compound | Reaction Medium | Percent Light Transmission, Minutes | | |
|---|---|---|---|---|
| | | 1.0 | 5.0 | 10 |
| N-octyl-B-alanine | acid | 34 | | 34 |
| N-dodecyl-B-alanine | do | 96 | 45 | 34 |
| N-tetradecyl-B-alanine | do | 72 | 37 | 21 |
| N-dodecyl-B-alanine | alkaline | 45 | 28 | 28 |
| Control | acid | less than 10 in ½ minute | | |
| Do | alkaline | Do. | | |

The precipitate in the controls coagulated and settled out within a very short time, but the particles formed in the presence of the beta-alanines were finely dispersed and none had settled completely at the end of an hour.

EXAMPLE X

A solution of N-dodecyl beta-alanine was prepared by adding 1 gram of the amino acid to 100 ml. of water and thereafter sufficient concentrated hydrochloric acid was added to make a clear solution. To 30 ml. of the beta-alanine solution 3 ml. of a 1% aqueous solution of silver nitrate were added. A control was prepared by adding the same amount of concentrated HCl to 100 ml. of water as that added to the beta-alanine solution. To 30 ml. of the control solution were added 3 ml. of the 1% silver nitrate solution. At the end of two minutes the control transmitted less than 10% light. The silver chloride that formed, in situ, in the presence of the N-dodecyl beta-alanine, however, lost its transparency very gradually. After 25 minutes it transmitted 84% light, at 105 minutes 76% and at 24 hours 60%. After 40 hours the silver halide was still fairly well dispersed.

EXAMPLE XI

Dispersion having concentrations of AgCl as high as 1% can be prepared in situ, by using more concentrated solutions of the beta-alanines as dispersing agents. A 5% solution of N-dodecyl beta-alanine in water was acidified with concentrated HCl until the solution was clear. To 30 parts of this amine-acid solution were added 3 parts of AgNO₃ of such strength that the final solution would contain 1% AgCl. On mixing the two solutions, the aqueous medium became opalescent, and within 5 minutes it was opaque. The particles did not settle out, however, for a period of two hours. A dispersion of this type could very readily be used for depositing, uniformly, a heavy layer of fine particle size silver chloride on plates or film. In the control sample which had no beta-alanine, the silver chloride clumped immediately and settled out of the fluid as a granular precipitate which could not be resuspended on shaking.

EXAMPLE XII

Mercurous chloride dispersions were prepared, in situ, in the presence of a solution of N-alkyl-beta-alanines in which the alkyl group had from 8 to 14 carbon atoms, by adding 3 ml. of a 1% water solution of mercurous nitrate to 30 ml. of a 1% aqueous solution of the amino acid containing sufficient chloride ion to react with the mercury.

The sodium salts of N-octyl beta-alanine and the N-tetradecyl beta-alanine were dissolved in water and sufficient concentrated hydrochloric acid was added to form a clear solution. The N-dodecyl beta-alanine used in this example was the free amino acid, in a 1% concentration, acidified with concentrated HCl to form a clear solution. The results of this test are tabulated below.

| Dispersing Compound | Percent Light Transmission, Minutes | | | | | |
|---|---|---|---|---|---|---|
|  | 2 | 5 | 10 | 15 | 30 | 105 |
| N-octyl beta-alanine | 39 | 35 |  | 28 |  |  |
| N-dodecyl beta-alanine | 88 | 86 |  |  | 55 | 45 |
| N-tetradecyl beta-alanine | 43 |  | 42 |  | 42 |  |

The controls which contained only hydrochloric acid, but no amino acid, showed rapid particle growth and settling of the mercury salt. At the end of 1.5 minutes the control run with the N-dodecyl beta-alanine had a light transmission of only 12% and settled rapidly thereafter.

EXAMPLE XIII

Copper salts are ordinarily soluble in aqueous acid media, but the hydroxide is comparatively insoluble in water. Therefore, a 1% solution of N-dodecyl beta-alanine in water was made alkaline with 30% KOH until the solution was clear. To 30 ml. of the alkaline amino acid solution were added 3 ml. of a 1% water solution of CuSO₄. A control was prepared with water and KOH, but no amino acid. At the end of 1.5 minutes the copper hydroxide in the control settled out completely. The copper hydroxide which was formed in situ in the presence of N-dodecyl beta-alanine was still in suspension at the end of one-half hour and showed little sign of settling.

Cadmium hydroxide dispersions can be prepared by the method of this example if a water-soluble cadmium salt is substituted for copper sulfate. The cadmium hydroxide dispersion does not retain its clarity, over an appreciable length of time and the suspension, though cloudy, does not settle out for a period of about 2 hours. The control on the other hand settles almost immediately and cannot be redistributed in the fluid medium on shaking, since it settles again almost immediately after shaking is stopped.

EXAMPLE XIV

A zinc sulfide dispersion was prepared, in situ, in a 1% N-dodecyl beta-alanine solution containing sufficient sulfide ions to react with the zinc ions under slightly alkaline conditions. The process consists of adding one part of the amino acid to 100 parts of water and sufficient Na₂S.9H₂O to clarify the solution. To 30 ml. of the amino acid solution were added 3 ml. of a 1% aqueous solution of zinc chloride. A control sample of sodium sulfide in water was prepared. On addition of the zinc salt to the sulfide solution there was an immediate precipitation of zinc sulfide. By contrast, the zinc sulfide formed in the presence of the amino acid had a light transmission of 57% after 5 minutes. At the end of 10 minutes some flocculant precipitate was observed, but this could be redispersed on shaking.

Other dispersing agents such as Daxad 11, a sodium alkyl naphthalene sulfate and Nacconol NRSF, an alkyl benzene sulfonate, both of which are known to be extremely efficient dispersing agents when employed in place of N-dodecyl beta-alanine in Examples II to IV had one minute light transmission values of only 56% and 5 minute light transmission values of only 9% and 17% respectively, indicating very poor initial dispersions with a rapid growth of particle size in 5 minutes. Other compounds also known to be excellent dispersing agents for dispersing other materials gave dispersions of silver chloride which were no better than those produced by Daxad 11 and Nacconol NRSF.

The aqueous dispersions containing silver halides in as high dilution as 0.001% (10 p. p. m.) to 0.1% by weight are exceedingly useful as germicides for medicinal purposes and as fungicides for agricultural and industrial uses. Less dilute dispersions, from 0.1% to 1.0% by weight are useful for the preparation of photographic films and papers because of the formation of such stable dispersions of minute particles. For photographic uses it is desirable to add a material to the aqueous dispersion of the silver halide to provide a water-soluble coating which can be applied to film, paper, or glass in preparing a light sensitive medium.

The following example demonstrates that the dispersions of silver halides prepared in the presence of dodecyl beta-alanine according to this invention are quite useful for deposition of a toxic quantity of water-insoluble silver salt as a protective against microorganisms.

EXAMPLE XV

A piece of white cotton duck conveyor belt fabric was cut into sixteen strips of approximately the same size. Four strips of white cotton duck conveyor belt fabric were immersed until wet in an aqueous solution containing 1% by weight of N-dodecyl beta-alanine and 0.012 molar HCl. Another four strips of the same white cotton fabric were immersed until wet in aqueous dispersion containing 0.0084% by weight of silver chloride and 0.1% N-dodecyl beta-alanine prepared as described in Examples I to IV. These twelve strips were tagged to identify the treatment received and then air dried. The remaining four strips were left untreated as a control. All sixteen strips were buried for four weeks in moist humus. At the end of the fourth week an attempt was made to recover the strips. Only a few fibers of the untreated control strips could be found. The strips treated with silver nitrate were rather weak, had been partially consumed by the microorganisms in the humus, were discolored by growing colonies of bacteria and fungi, and there was some evidence of burning by nitric acid. Much of the silver nitrate either had been removed from the fabric by the leaching effect of the moisture in the humus or had been hydrolized and thus caused the burning. There were recovered only random fibers of the strips treated with the acidic aqueous solution of N-dodecyl beta-alanine. All four strips treated with the aqueous colloidal dispersion of silver chloride containing N-dodecyl beta-alanine as the dispersing agent were recovered. All four strips were still white and strong showing no signs of acid burn or microorganism growth.

EXAMPLE XVI

Four strips of cotton belt fabric were immersed until wet in the silver chloride dispersion described in Example V, sun dried and laid upon strips of vulcanizable rubber sheet. Another four strips of cotton belt fabric were placed upon strips of vulcanizable rubber sheet. These strips of fabric on rubber were placed in a press and heated until the rubber was vulcanized. The resulting strips were buried in moist humus for two weeks and then removed. The fabric which had received no treatment was about 30% consumed by microorganisms. There was also considerable discoloration by colonies of microorganisms. But the fabric treated with the dispersed silver chloride had not been affected by the microorganisms in any way.

The above soil burial tests demonstrate that the aqueous coloidal dispersions of this invention can be employed to deposit a desired quantity of a water-insoluble heavy metal salt in a uniform manner. The above-described aqueous collidal dispersions of silver halides can also be sprayed with conventional high and low pressure spraying equipment. Here also the advantage of depositing minute particles of silver halide uniformly over the vegatative surfaces of plant life are readily appreciated. Neither silver nitrate, the only water-soluble silver salt economically feasible to use or even silver proteinate which is slightly soluble in water can be used on plants even where removal by the leaching effect of dew and rain is of no importance. Silver nitrate hydrolizes slowly and the nitric acid formed as a hydrolysis by-product burns the plant tissues while silver proteinate stains the plant foliage to an extent which cannot be tolerated.

Many loci of infection by microorganisms cannot be safely treated with silver nitrate because the burning of tissues by the nitric acid is less desirable than the rapid control of the microorganism by the silver compound. The aqueous colloidal dispersions of water-insoluble silver salts prepared according to this invention do not contain any such tissue burning substance and therefore find many medicinal uses against microorganisms.

Likewise the toxic properties of mercury, copper, cadmium and gold compounds can be utilized by preparing an aqueous colloidal dispersion of minute particles of water-insoluble salts and complexes of these metals in situ in the presence of an N-alkyl beta-amino propionic acid as hereinbefore described.

This application is a continuation-in-part of our application, Serial Number 237,486, filed July 18, 1951, now abandoned.

We claim:

1. A composition consisting essentially of from about 0.001% to about 1% by weight of a member selected from the class consisting of water-insoluble salts and hydroxides of a heavy metal of groups IB and IIB of the periodic table dispersed in an aqueous solution containing from 0.05% to 5% by weight of an N-alkyl beta-amino propionic acid whose alkyl group contains from 8 to 14 carbon atoms, said water-insoluble salt being formed in situ, in the presence of said N-alkyl beta-amino propionic acid, as a temporarily stable dispersion of very minute particles which increase in size slowly over a period of from about 15 minutes to about 40 hours before flocculating from suspension.

2. A composition consisting essentially of from about 0.001% to about 1% by weight of a water-insoluble halide of a heavy metal of groups IB and IIB of the periodic table dispersed in an aqueous solution containing from 0.05% to 5% by weight of an N-alkyl beta-amino propionic acid whose alkyl group contains from 8 to 14 carbon atoms, said water-insoluble halide being formed in situ as a dispersion of very minute particles which increase in size very slowly over a period up to 40 hours before flocculating from suspension.

3. A composition consisting essentially of from about 0.001% to about 1% by weight of a water-insoluble hydroxide of a metal of groups IB and IIB of the periodic table dispersed in an aqueous solution containing from about 0.05% to about 5% by weight of an N-alkyl beta-amino propionic acid whose alkyl group contains from 8 to 14 carbon atoms, said water-insoluble hydroxide being formed in situ, in the presence of said N-alkyl beta-amino propionic acid, as a temporarily stable dispersion of very minute particles which increase in size slowly over a period of several hours before floculating from suspension.

4. A composition of claim 2 in which the water-insoluble halide is mercurous halide.

5. A composition consisting essentially of from 0.001% to 1% by weight of a silver halide dispersed in an aqueous solution containing from 0.05% to 5% by weight of an N-alkyl beta-amino propionic acid whose alkyl group contains 8 to 14 carbon atoms, said silver halide being formed in situ as a dispersion of very minute particles which increase in size slowly over a period of from about 15 minutes to about 40 hours before flocculating from suspension.

6. A composition consisting essentially of from 0.001% to 1% by weight of silver chloride dispersed in an aqueous solution containing from 0.05% to 5% by weight of N-dodecyl beta-alanine, said silver chloride being formed in situ as a dispersion of very minute particles which increase in size slowly over a period of from about 15 minutes to about 40 hours before flocculating from suspension.

7. A composition consisting essentially of from about 0.001% to about 1% by weight of mercurous chloride dispersed in an aqueous solution containing from about 0.05% to about 5% by weight of N-dodecyl beta-amino propionic acid, said mercurous chloride being formed in situ as a dispersion of very minute particles which increase in size slowly over a period of several hours before flocculating from suspension.

8. A composition consisting essentially of from about 0.001% to about 1% by weight of copper hydroxide dispersed in an aqueous solution containing from about 0.5% to about 5% by weight of N-dodecyl beta-amino propionic acid, said copper hydroxide being formed in situ as a dispersion of very minute particles which increase in size very slowly over a period of several hours before flocculating from suspension.

9. A composition consisting essentially of from 0.001% to about 1% by weight of zinc sulfide dispersed in an aqueous solution containing from 0.5% to about 5% by weight of N-dodecyl beta-amino propionic acid, said zinc sulfide being formed in situ as a dispersion of very minute particles which increase in size slowly over a period of several hours before flocculating from suspension.

10. A composition consisting essentially of from 0.001% to about 1% by weight of cadmium hydroxide dispersed in an aqueous solution containing from 0.5% to about 5% by weight of N-dodecyl beta-amino propionic acid, said cadmium hydroxide being formed in situ as a dispersion of very minute particles which increase in size slowly over a period of several hours before flocculating from suspension.

11. The method of preparing an aqueous dispersion of a member selected from the class consisting of water-insoluble salt and hydroxide of a heavy metal of groups IB and IIB of the periodic table which comprises forming said water-insoluble compound in situ in a concentration range from about 0.001% to about 1% by weight in an aqueous solution containing from 0.05% to 5% by weight of an N-alkyl beta-amino propionic acid whose alkyl group contains from 8 to 14 carbon atoms the said dispersion being temporarily stable and flocculating from suspension after a period from about 15 minutes to about 40 hours.

12. The method of preparing an aqueous dispersion of a water-insoluble halide of a heavy metal of groups IB and IIB of the periodic table which comprises forming the water-insoluble halide in situ in a concentration range from about 0.001% to about 1% by weight in an aqueous solution containing from 0.05% to 5% by weight of an N-alkyl beta-amino propionic acid whose alkyl group contains from 8 to 14 carbon atoms the said dispersion being temporarily stable and flocculating from suspension after a period from about 15 minutes to about 40 hours.

13. The method of preparing an aqueous dispersion of silver chloride which comprises forming said chloride in situ in a concentration range from about 0.001% to about 1% by weight in an aqueous solution containing from 0.05% to 5% by weight of N-dodecyl beta-alanine the said dispersion being temporarily stable and flocculating from suspension after a period from about 15 minutes to about 40 hours.

References Cited in the file of this patent

UNITED STATES PATENTS

| | | |
|---|---|---|
| 2,249,023 | Minaeff et al. | July 15, 1941 |
| 2,250,390 | Minaeff et al. | July 22, 1941 |
| 2,291,735 | Leffler | Aug. 4, 1942 |
| 2,468,012 | Isbell | Apr. 19, 1949 |